July 31, 1923.
L. H. KENT ET AL
WINDSHIELD
Filed April 16, 1920
1,463,704
2 Sheets-Sheet 1
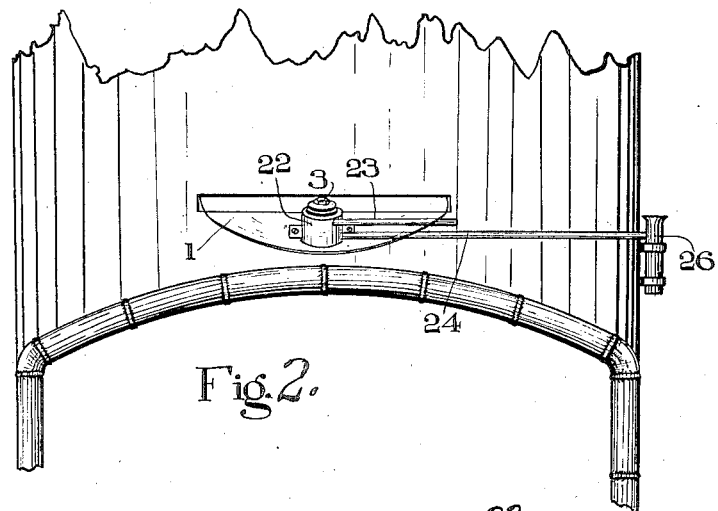
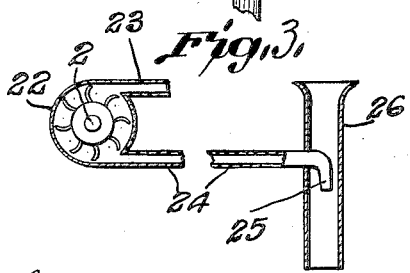
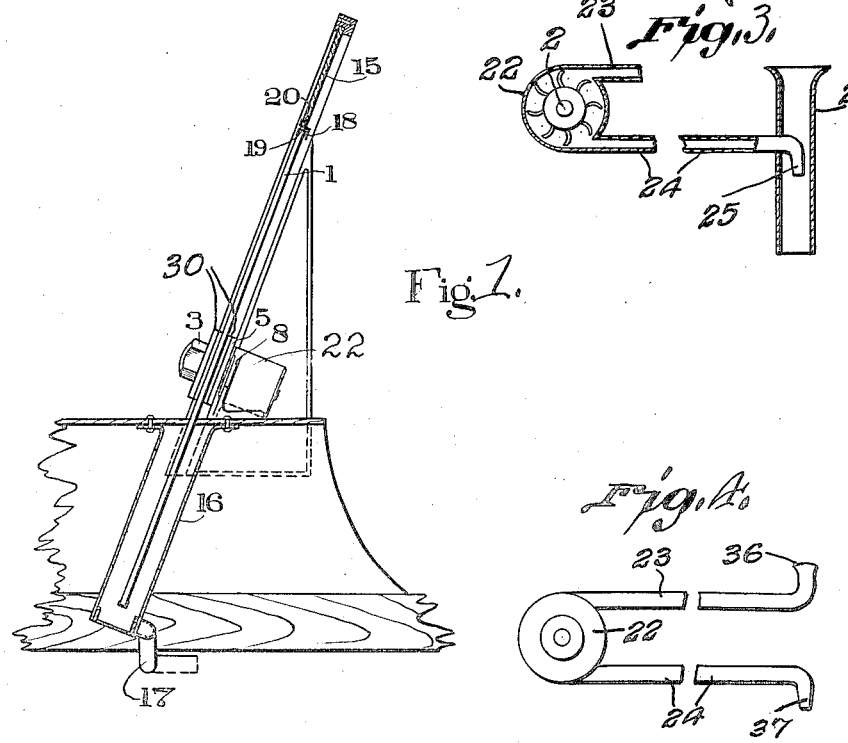
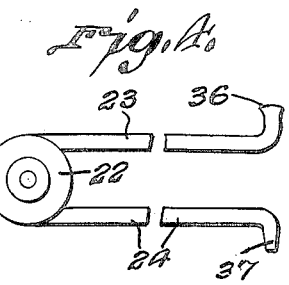
Inventors
L. H. Kent
S. A. De Normanville
by *[signature]*
Att'y

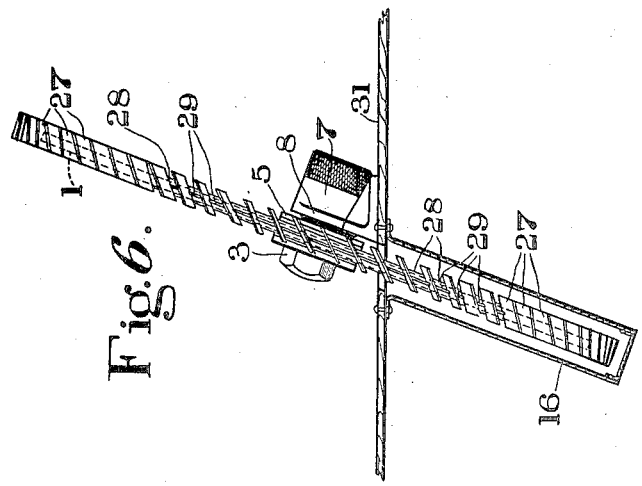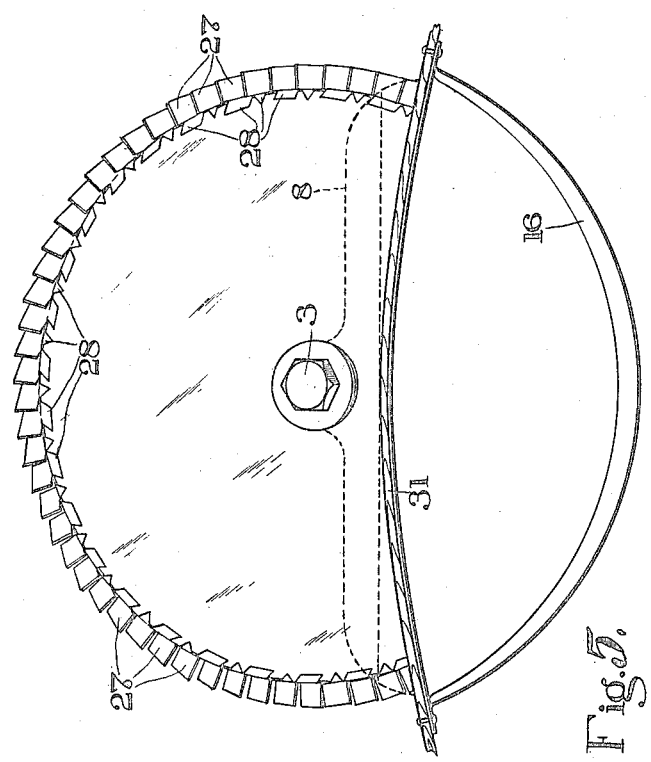

Patented July 31, 1923.

1,463,704

UNITED STATES PATENT OFFICE.

LESLIE HARCOURT KENT, OF STANMORE, AND SAMUEL AUGUSTINE DE NORMANVILLE, OF LONDON, ENGLAND.

WINDSHIELD.

Application filed April 16, 1920. Serial No. 374,443.

*To all whom it may concern:*

Be it known that we, LESLIE HARCOURT KENT and SAMUEL AUGUSTINE DE NORMANVILLE, subjects of the King of Great Britain and Ireland, residing at Stanmore, Middlesex, England, and London, England, respectively, have invented certain new and useful Improvements in Windshields, of which the following is a specification.

The object of the invention is to provide a clear view screen for the pilot, and in some instances for the passengers, of aeroplanes and other air craft, and particularly to avoid obstruction of the screen by rain or mist, and in cases where the screen is behind the engine, to avoid adherence of oil thrown off by the engine.

The screen according to the invention comprises a transparent disc and means for rotating it at a suitable speed, such driving means preferably being dependent on the flight of the aeroplane or on the running of the engine, so that the pilot is relieved of any necessity to control the screen.

In the accompanying drawings several modes of applying the invention are illustrated by way of example.

Fig. 1 is a side elevation illustrating the invention in its preferred form.

Fig. 2 is a plan view of a slight modification.

Fig. 3 is a sectional view illustrating the means for operating the turbine of the preferred form.

Fig. 4 is a plan of a slight modification of such means.

Fig. 5 is a front elevation, and

Fig. 6 is a side elevation showing the screen provided with a modified form of driving means.

In one form of the invention as illustrated by Figures 1 and 2, a disc 1 of glass or other suitable transparent material, is clamped on a spindle 2 by means of a screwed cap or nut 3. The nut 3 clamps the disc 1 against a shoulder 5 on the spindle, suitable packing 30 being interposed. The spindle 2 is mounted in a casing 22 carried by an angular bracket 8, secured to the fairing 31 of the fuselage in a suitable position for the pilot. The bracket 8 is so arranged that the spindle 2 is inclined at about 20° or any other convenient angle to the line of flight in order that the glass disc 1 shall be at a suitable angle to deflect the air over the pilot's head. The spindle of the disc 1 of the form shown in Figs. 1 and 2, is fitted with a turbine wheel 21 arranged within the casing 22 which has an air inlet 23 and an outlet or suction pipe 24. The pipe 24 terminates in a reverse Pitot tube 25 arranged in a tube 26 having a wide mouth or inlet and open at the opposite or exhaust end. The tube 26 is preferably arranged outside the fuselage.

During the flight of the aeroplane, the suction set up by the Pitot tube causes an inrush of air through the inlet 23 onto the turbine wheel which revolves at high speed and correspondingly rotates the disc 1. In the modification shown in Fig. 4, the inlet tube 23 has a bell mouth 36 facing forward and the pipe 24 is merely an exhaust pipe terminating in a rearward extension or outlet 37.

A screen such as above described presents a clear view to the pilot irrespective of mist or rain, as all particles of moisture are thrown off the disc by centrifugal action. Similarly oil scattered by the engine and striking the disc is thrown off by centrifugal action.

A clear view screen 1, such as above described, may be set in a fixed screen as indicated in Figure 1, wherein 15 is a fixed screen, similar reference numerals indicating corresponding parts to those above described.

A guard 16 is provided for the lower part of the disc 1 the guard having a drain pipe 17. In order to avoid ingress of moisture between the periphery of the disc 1 and the adjacent edge of the fixed screen 15, the latter is fitted with a metal flange 18. Both edges are reinforced with spun metal rings 19, 20.

Figures 5 and 6 illustrate a simple form of windmill for rotating the disc 1. The disc carries on its periphery a number of vanes 27. The vanes 27 are conveniently stamped out of sheet metal and have side flanges 28 clipping the sides of the disc. The vanes are also secured by a wire 29. The vanes are adapted for the direct action of the air during flight.

While several modes of driving the disc or clear view screen have been described, it is to be understood that other suitable driving means may be adopted, it being preferable that the driving of the disc shall be dependent on the flight of the aeroplane or running of the engine, although means may be provided for cutting out the drive in fine weather so that the disc need not be run unnecessarily and undue wear may be avoided.

We claim:

1. A clear view windshield for an aeroplane or other fast moving vehicle, including a transparent disc and a wind mill operatively connected therewith for rotating the same, said disc and said wind mill being mounted for rotation about a common axis.

2. A clear view wind shield for an aeroplane or other fast moving vehicle, including a transparent disc, a spindle for said disc, an angular bracket having a bearing for supporting said spindle, and a wind mill operatively connected to said disc for rotating the same and revoluble about the axis of said spindle.

3. A clear view windshield for an aeroplane or other fast moving vehicle comprising a transparent disc, a spindle for said disc, a bearing for supporting said spindle, and a windmill for rotating said disc comprising a turbine mounted on said spindle, a casing surrounding said turbine having inlet and outlet tubes and means for inducing a current of air through said tubes and casing substantially as and for the purpose hereinbefore set forth.

4. A clear view windshield for an aeroplane or other fast moving vehicle comprising a transparent disc having a spindle, a bearing for supporting said spindle and a windmill for rotating said disc comprising a turbine mounted on said spindle, a casing for said turbine provided with inlet and outlet tubes, the end of the outlet tube remote from said casing being rearwardly inclined to form a Pitot tube, and a bellmouth tube surrounding said Pitot tube substantially as and for the purpose hereinbefore set forth.

In testimony whereof we have signed our names to this specification in the presence of two subscribing witnesses.

LESLIE HARCOURT KENT.
SAMUEL AUGUSTINE de NORMANVILLE.

Witnesses:
PHILIP W. KENT,
W. L. TEBBY.